United States Patent
Ossipov

(10) Patent No.: US 9,258,213 B2
(45) Date of Patent: Feb. 9, 2016

(54) DETECTING AND MITIGATING FORWARDING LOOPS IN STATEFUL NETWORK DEVICES

(75) Inventor: Andrew E. Ossipov, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 653 days.

(21) Appl. No.: 13/483,688

(22) Filed: May 30, 2012

(65) Prior Publication Data

US 2013/0322444 A1    Dec. 5, 2013

(51) Int. Cl.
| | |
|---|---|
| H04L 12/56 | (2006.01) |
| H04L 12/705 | (2013.01) |
| H04L 12/46 | (2006.01) |
| H04L 12/803 | (2013.01) |
| H04L 29/06 | (2006.01) |
| H04L 12/709 | (2013.01) |
| H04W 80/04 | (2009.01) |
| H04L 12/741 | (2013.01) |

(52) U.S. Cl.
CPC ............ *H04L 45/18* (2013.01); *H04L 12/4641* (2013.01); *H04L 45/245* (2013.01); *H04L 47/125* (2013.01); *H04L 63/0892* (2013.01); *H04L 45/54* (2013.01); *H04W 80/04* (2013.01)

(58) Field of Classification Search
CPC ..... H04L 45/18; H04L 45/54; H04L 63/0892; H04L 45/00; H04L 45/245; H04L 12/4641; H04L 47/125; H04W 80/04
USPC ................. 370/392, 229, 235, 248–254, 386
See application file for complete search history.

(56) References Cited

U.S. PATENT DOCUMENTS

| | | | |
|---|---|---|---|
| 6,665,305 B1 | 12/2003 | Weismann | |
| 7,082,531 B1 | 7/2006 | Chen et al. | |
| 7,206,288 B2 | 4/2007 | Cometto et al. | |
| 7,830,809 B2 | 11/2010 | Cometto et al. | |
| 8,761,007 B1* | 6/2014 | Damle | H04L 45/18 370/229 |
| 2008/0112323 A1* | 5/2008 | Agmon | H04L 12/4641 370/235 |
| 2010/0125665 A1* | 5/2010 | Simpson et al. | 709/224 |
| 2012/0230335 A1 | 9/2012 | Filsfils et al. | |

* cited by examiner

*Primary Examiner* — Jae Y Lee
*Assistant Examiner* — Jean F Voltaire
(74) *Attorney, Agent, or Firm* — Parker Ibrahim & Berg LLC; James M. Behmke; Stephen D. LeBarron

(57) ABSTRACT

In one embodiment, a stateful device receives a packet on a particular interface of a stateful device in a computer network, where the packet includes source identification and destination identification. The source identification and destination identification of the packet may then be swapped and checked against a stateful connection table managed at the stateful device for the particular interface, such that a loop may be detected at the particular interface in response to the swapped source identification and destination identification matching an existing entry in the stateful connection table. In the event there is such a detected loop, the packet (e.g., and any subsequent similar packets) may to be dropped, accordingly.

18 Claims, 9 Drawing Sheets

DETECTING AND MITIGATING FORWARDING LOOPS IN STATEFUL NETWORK DEVICES

TECHNICAL FIELD

The present disclosure relates generally to computer networks, and, more particularly, to loop detection in stateful network devices.

BACKGROUND

Most routers today are Layer 3 IP routers that examine the source and destination IP addresses of each packet, look up the destination of the packet in the router's IP routing table, and route that packet on its way toward the destination. In the event that the destination is not listed in the routing table, the router will generally either send the packet to a default route (if it has one) or drop the packet. Routers are usually used to connect a local area network (LAN) to a wide area network (WAN), but can also be used to segment large LANs. During certain network failures, however, a forwarding loop can occur between a router (or other stateful device) and another device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a stateful device receives a packet on a particular interface of a stateful device in a computer network, where the packet includes source identification and destination identification. The source identification and destination identification of the packet may then be swapped and checked against a stateful connection table managed at the stateful device for the particular interface, such that a loop may be detected at the particular interface in response to the swapped source identification and destination identification matching an existing entry in the stateful connection table. In the event there is such a detected loop, the packet (e.g., and any subsequent similar packets) may be dropped, accordingly.

Description

Figure 1:
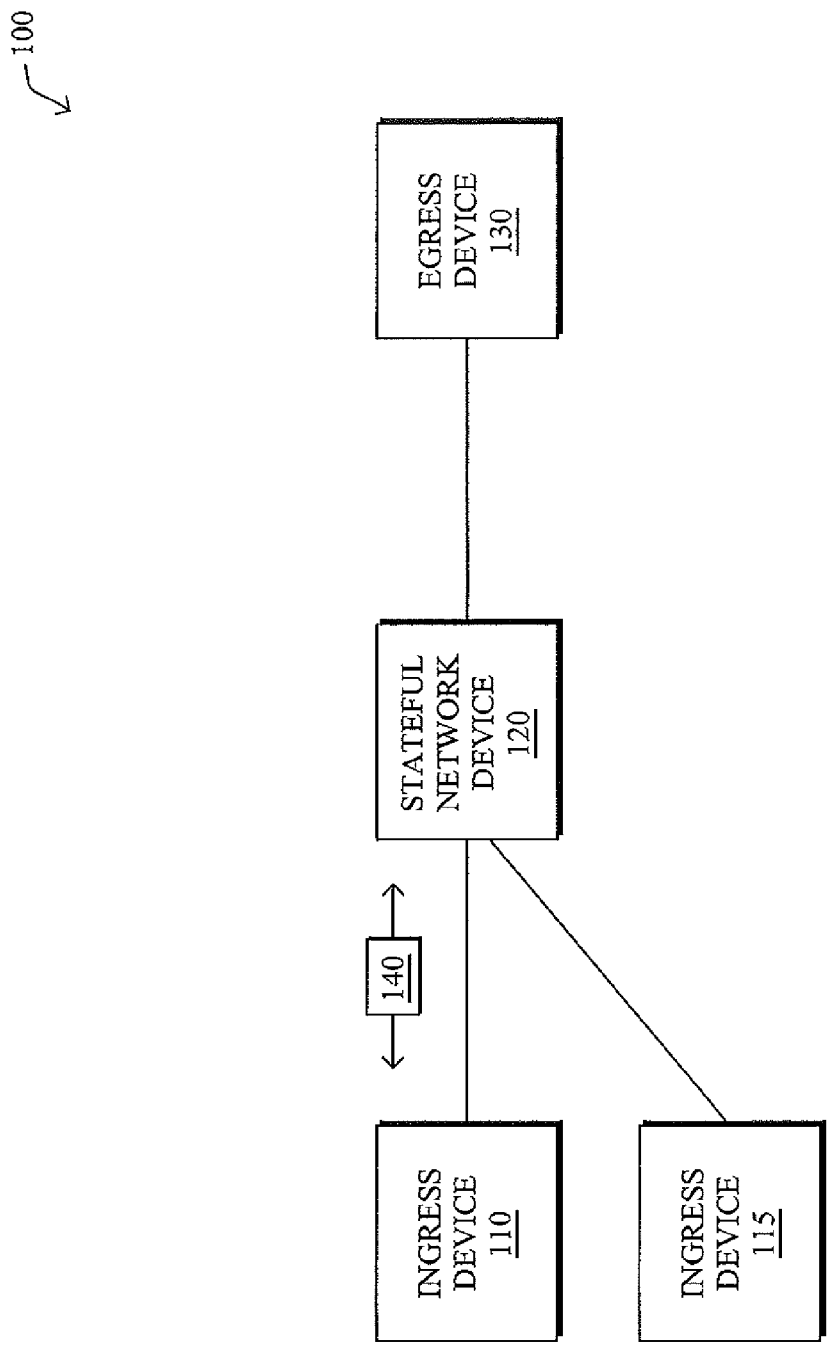
FIG. 1 illustrates an example communication network.

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others FIG. 1 is a schematic block diagram of an example simplified computer network 100 illustratively comprising nodes/devices interconnected by various methods of communication, such as ingress devices 110 and 115, a stateful network device 120, and an egress device 130 interconnected as shown. For instance, the links may be wired links or shared media (e.g., wireless links, etc.) where certain nodes, such as, e.g., routers, switches, service devices, etc., may be in communication with other nodes, e.g., based on physical connectivity, distance, signal strength, current operational status, location, etc. Those skilled in the art will understand that any number of nodes, devices, links, etc. may be used in the computer network, and that the view shown herein is for simplicity.

Data packets 140 may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Figure 2:
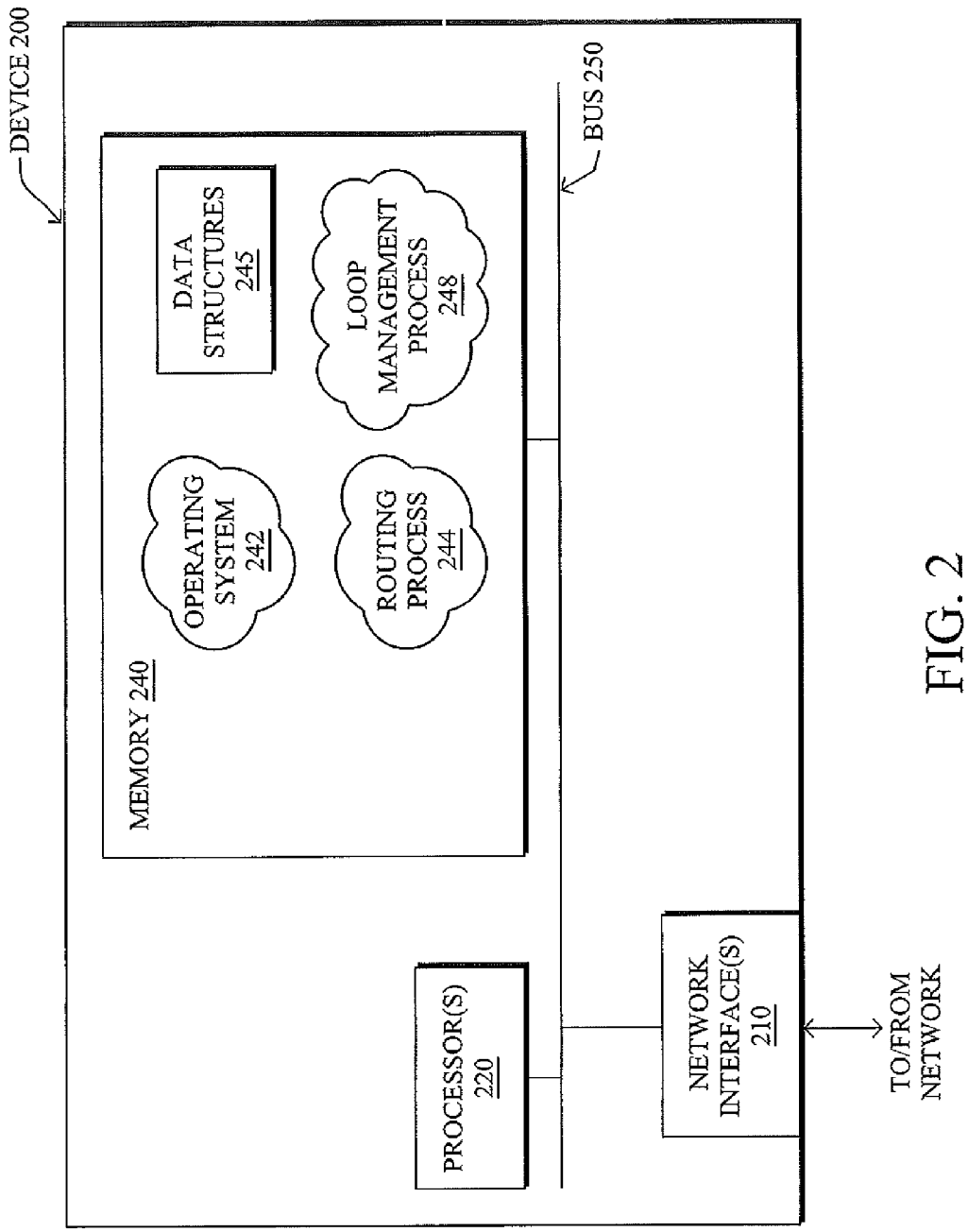
FIG. 2 illustrates an example network device/node.

FIG. 2 is a schematic block diagram of an example node/device 200 that may be used with one or more embodiments described herein, e.g., particularly as stateful network device 120 as shown in FIG. 1 above. The device may comprise one or more network interfaces 210 (e.g., wired, wireless, etc.), at least one processor 220, and a memory 240 interconnected by a system bus 250.

The network interface(s) 210 comprise the mechanical, electrical, and signaling circuitry for communicating data over links coupled to the network 100. The network interfaces may be configured to transmit and/or receive data using one or more different communication protocols. Note, further, that the nodes may have two different types of network connections 210, e.g., wireless and wired/physical connections, and that the view herein is merely for illustration.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245, such as a stateful table as described herein. An operating system 242, portions of which are typically resident in memory 240 and executed by the processor, functionally organizes the device by, inter alia, invoking operations in support of software processes and/or services executing on the device. These software processes and/or services may comprise routing process 244, and an illustrative loop management process 248, as described herein. Note that while routing process 244 and loop management process 248 are shown in centralized memory 240, certain embodiments provide for the processes (or portions thereof) to be specifically operated within the network interfaces 210, such as a component of a MAC layer.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, loop management process 248 may, in certain embodiments, be a component of routing process 244.

Routing process 244, in particular, may comprise computer executable instructions executed by the processor 220 to perform functions provided by one or more routing protocols, as will be understood by those skilled in the art. These functions may be configured to manage a routing/forwarding table (a data structure 245) containing, e.g., data used to make routing/forwarding decisions. In addition, routing process 244 may also be configured to manage a stateful table, as described herein.

Generally, network devices utilize one or more routing protocols to transmit packets 140 toward one or more destination devices. However, due to various circumstances within a computer network 100, such as interface failures, link failures, misconfigurations, malicious attacks, etc., loops may occur in the network where the same device repeatedly receives the same copy of a forwarded packet.

Figure 3:
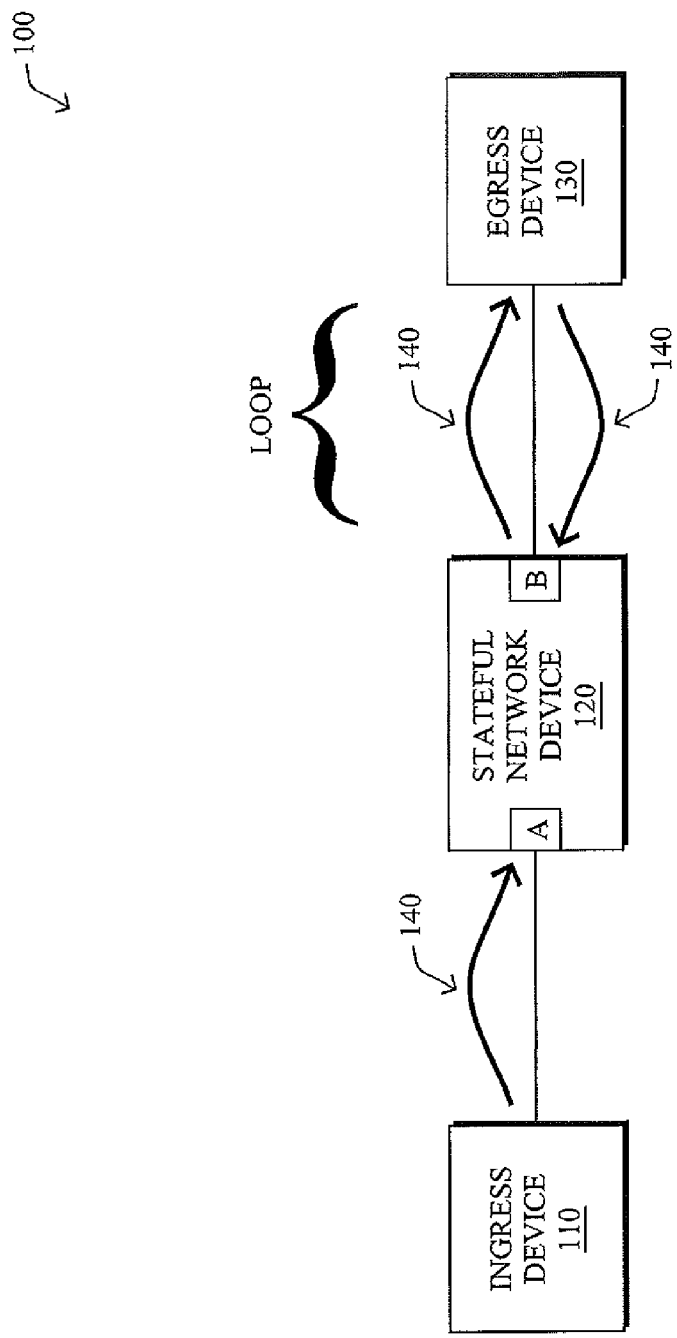
FIG. 3 illustrates an example loop in the communication network of FIG. 1.

FIG. 3 illustrates a simplified example of a loop in the network of FIG. 1. Specifically, consider the example where a client device behind the ingress device 110 (e.g., a router, a client device, etc.) initiates a connection to some destination behind egress device 130 through the stateful network device 120 (e.g., a firewall). Upon receiving the first packet 140 on interface "A", the firewall creates a stateful connection entry and forwards that traffic to the egress router on interface "B". However, if there is a loop, the egress device 130 will forward the traffic (packet 140) back to interface B of the stateful device 120, where it will be processed again, and routed back to the egress device 130, continually.

Forwarding loops (e.g., layer-3 loops) are thus generally harmful to network device performance, such as for routers and other stateful devices (e.g., firewalls, content engines, load balancers, etc.) that process packets in software and maintain connection tables for state tracking purposes. When certain traffic is looped through such a device, loops take processing resources away from legitimate traffic and place significant loads on the upstream devices as well. For example, if port address translation (PAT) is in use, more stateful connection entries will be created on the stateful device (e.g., firewall) for these looped packets. Even when a loop is detected, it is sometimes difficult to reach the respective misconfigured device due to the overloaded network in order to correct the situation. Network administrators spend considerable time and resources on troubleshooting these situations.

Currently, loop mitigation is limited to non-stateful features, such as time-to-live (TTL) counters. Many security devices (e.g., firewalls), however, do not decrement TTL by default, and even if they did, it does not solve the congestion problem at the network and CPU complex levels. That is, even if the packets are looped back and forth until the expiration of the TTL (which can easily be greater than one hundred iterations), resources are wasted on these looping connections while decrementing the TTL. Other solutions, such as unicast Reverse Path Forwarding (uRPF), do not provide protection in all cases. For instance, uRPF is the most commonly used mechanism to drop looped traffic, but it does not provide protection (even in strict mode) when the loop occurs on the default-route interface when network address translation (NAT) is in use (typical for edge devices, like firewalls). Further, even if the looped traffic is correctly blocked, the original traffic may continue to flow through the stateful device thus continuing to waste the resources. That is, the example client above, and possibly other client devices (behind ingress device 110 and/or 115), may continue to generate traffic through the stateful device 120 to the same destination, and this traffic will be looped back as well.

Loop Management

The techniques herein allow for the use of stateful connection information to detect loops by a stateful device, and accordingly reduce the impact of a detected loop by potentially blocking the suspected traffic at the ingress interface to preserve the local and upstream processing resources. Specifically, according to one or more embodiments of the disclosure as described in detail below, when a stateful device receives a packet on a particular interface of a stateful device in a computer network, the source identification and destination identification of the packet may then be swapped and checked against a stateful connection table managed at the stateful device for the particular interface, such that a loop may be detected at the particular interface in response to the swapped source identification and destination identification matching an existing entry in the stateful connection table. In the event there is such a detected loop, the packet (e.g., and any subsequent similar packets) may be dropped, accordingly.

Illustratively, the techniques described herein may be performed by hardware, software, and/or firmware, such as in accordance with the loop management process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional routing/communication protocols and stateful table management protocols, and as such, may be processed by similar components understood in the art that execute those protocols, accordingly. In particular, the techniques described herein may be accomplished through enhancements to existing packet processing infrastructure.

Figure 4:
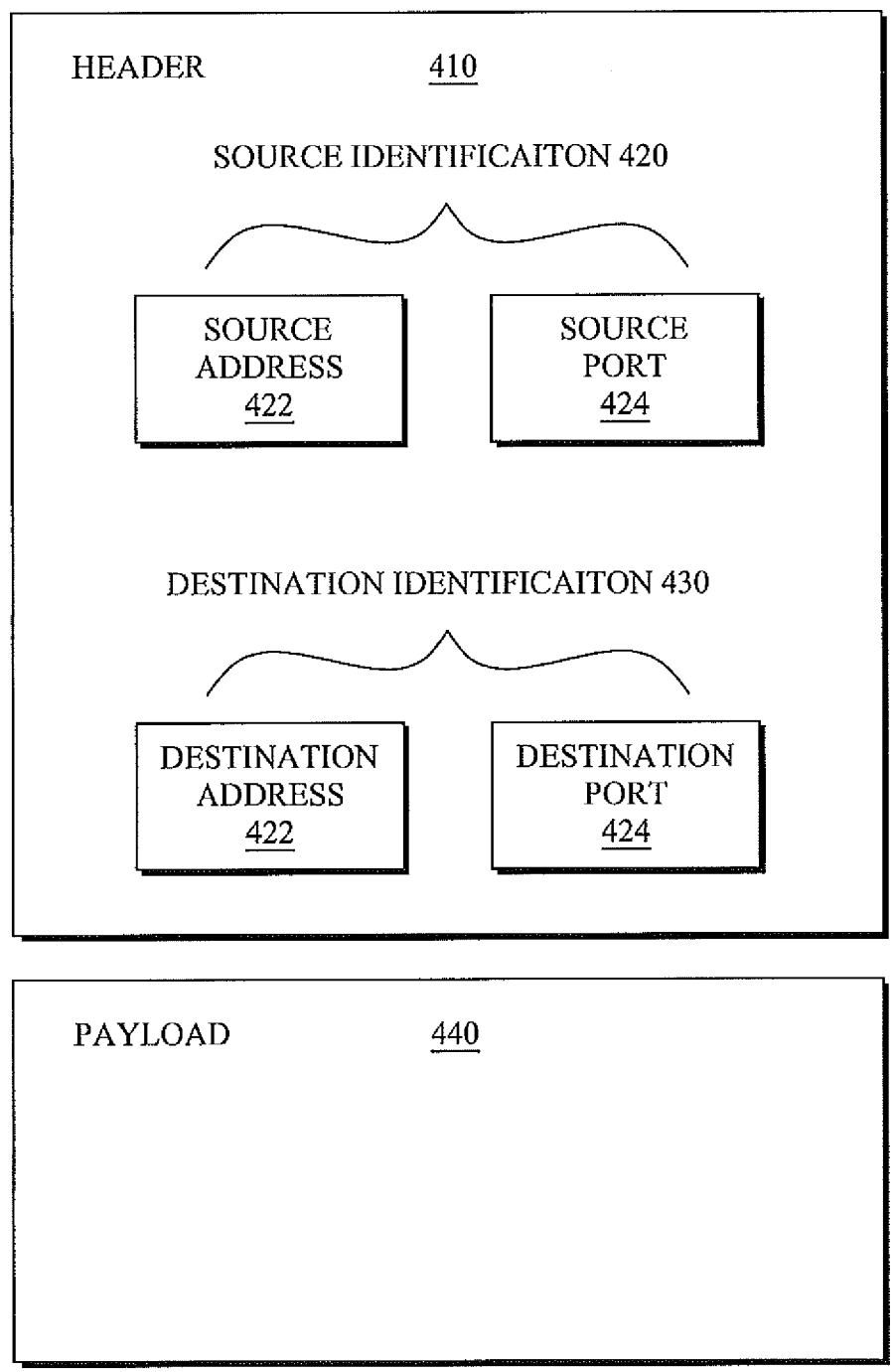
FIG. 4 illustrates an example packet.

Operationally, since a stateful network device (such as a firewall) typically performs a lookup against its stateful connection table for every ingress packet, it is possible to detect forwarding loops on per-connection basis. FIG. 4 illustrates an example simplified packet 400 (e.g., 140 of FIG. 1) generally comprising a header 410 and a payload 440. The header 410 comprises a plurality of fields that may be used by communicating devices to route/forward the packet through the network 100 from source devices to destination devices. Accordingly, the header 410 may comprise a source identification 420, such as, e.g., a source address (e.g., IP address) 422 and a source port 424. The header may also comprise a destination identification 430, such as, e.g., a to destination address 432 and a destination port 434. Other types of source and destination identifications may be used, such as labels, tags, group identifiers, etc., and those shown in FIG. 4 are merely an example as would be understood by those skilled in the art.

Assume, per the example given above, that the ingress device 110 (e.g., a client) initiates a TCP connection from source address "1.1.1.1" and port "11111" (hereinafter "1.1.1.1:11111" according to an illustrative IPv4 format understood in the art) to a service at 2.2.2.2:80 through the stateful network device 120 (e.g., a firewall). Suppose that the stateful network device 120 determines interface B to be the egress interface for this traffic with the egress device 130 as the next hop. Notably, assume that PAT policy on the stateful network device maps the source from 1.1.1.1:11111 to 3.3.3.3:33333 when going out of interface B. The stateful network device 120 then creates an entry in its stateful table to describe the connection in question.

Figure 5:
FIG. 5 illustrates an example stateful table.

FIG. 5 illustrates an example stateful table 500 (e.g., a stored data structure 245 in FIG. 2), illustratively comprising one or more entries of populated fields. In particular, the stateful table may comprise the following illustrative fields:

```
<inside_interface> field 505;
<inside_real_IP> field 510;
<inside_real_port> field 515;
<inside_global_IP> field 520;
<inside_global_port> field 525;
<outside_interface> field 530;
<outside_local_IP> field 535;
<outside_local_port> field 540;
<outside_global_IP> field 545; and
<outside_global_port> field 550.
```

In general, the "inside" fields 505-525 correspond to the source device from which a packet is received on an ingress interface, while the "outside" fields 530-550 correspond to the destination and a particular egress port on which the packets are being forwarded. Note that as used hereinafter, the text format of the stateful table entries will take the following form (according to each field's reference number):

510:515 (520:525)->[530] 535:540 (545:550).

In this manner, according to the example above, an illustrative stateful table entry would be:

[A] 1.1.1.1:11111 (3.3.3.3:33333)->[B] 2.2.2.2:80 (2.2.2.2:80).

(Note that while the source information and destination information illustratively comprise IP addresses and ports, the techniques herein are equally applicable to addresses, address and port pairs, connection entries, sockets, transport services, etc.)

Once the first packet of the connection is forwarded from the stateful network device 120 to the egress (upstream) device 130, when a routing loop exists the latter simply forwards the packet right back to the stateful network device. As such, the stateful network device 120 will receive the following packet ingress (source->destination pair) on interface B:

3.3.33:33333->2.2.2.2:80.

Conventional stateful connection procedure at this point provides for a stateful lookup to match the packet to an existing stateful connection entry. In particular, the previously created entry expects the following packet in return on interface B (that is, a responding packet from the destination back to the source) as:

2.2.2.2:80->3.3.3.3:33333.

Since the looped packet does not match this pattern, the stateful network device (depending on configuration) will attempt to create a new stateful connection entry and/or loop the traffic back to the egress device 130. Other outbound connections to the same destination (2.2.2.2:80) will exhibit the same behavior. In the best case scenario, these will congest the stateful network device's interface B (competing with legitimate traffic) as well as the uplink, and will also put strain on the packet processing subsystem. Conversely, in a worst case scenario, the connections will exhaust the stateful network device's memory by growing the stateful connection table 500 exponentially.

The techniques herein, on the other hand, add one more stateful lookup for each new connection. In particular, in addition to directly matching a received packet against the connection table 500, the stateful network device 120 reverses the source and destination socket information for the second lookup. In other words, when receiving a packet on an interface, the stateful device swaps the source identification 420 and destination identification 430 of the packet, and checks the swapped source and destination identification against the stateful connection table 500. According to the example herein, then, upon receiving the looped packet on interface B (3.3.3.3:33333->2.2.2.2:80), a first direct lookup is performed as mentioned above, but then, as shown in FIG. 6, the techniques perform the swap of the source and destination information, notably while keeping ingress interface (B) the same, i.e., 2.2.2.2:80->3.3.3.3:33333.

Figure 6:
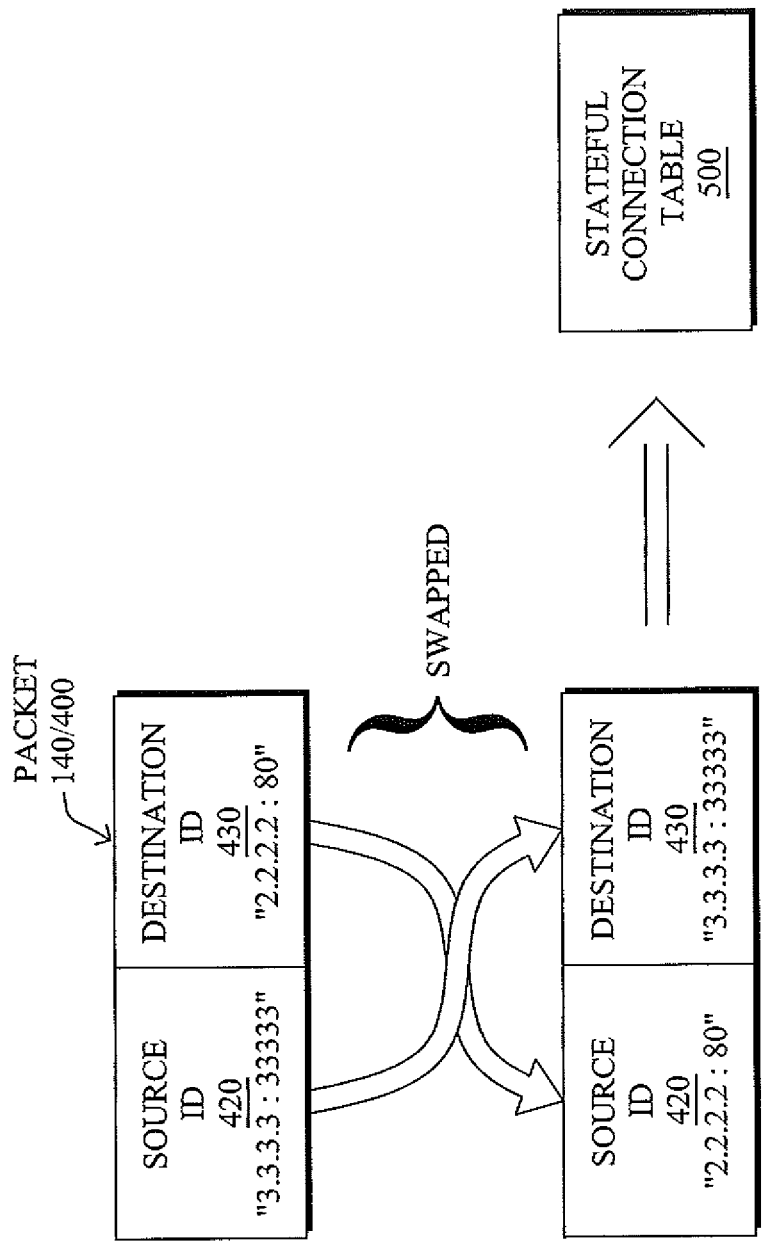
FIG. 6 illustrates an example of loop detection.
Figure 7A:
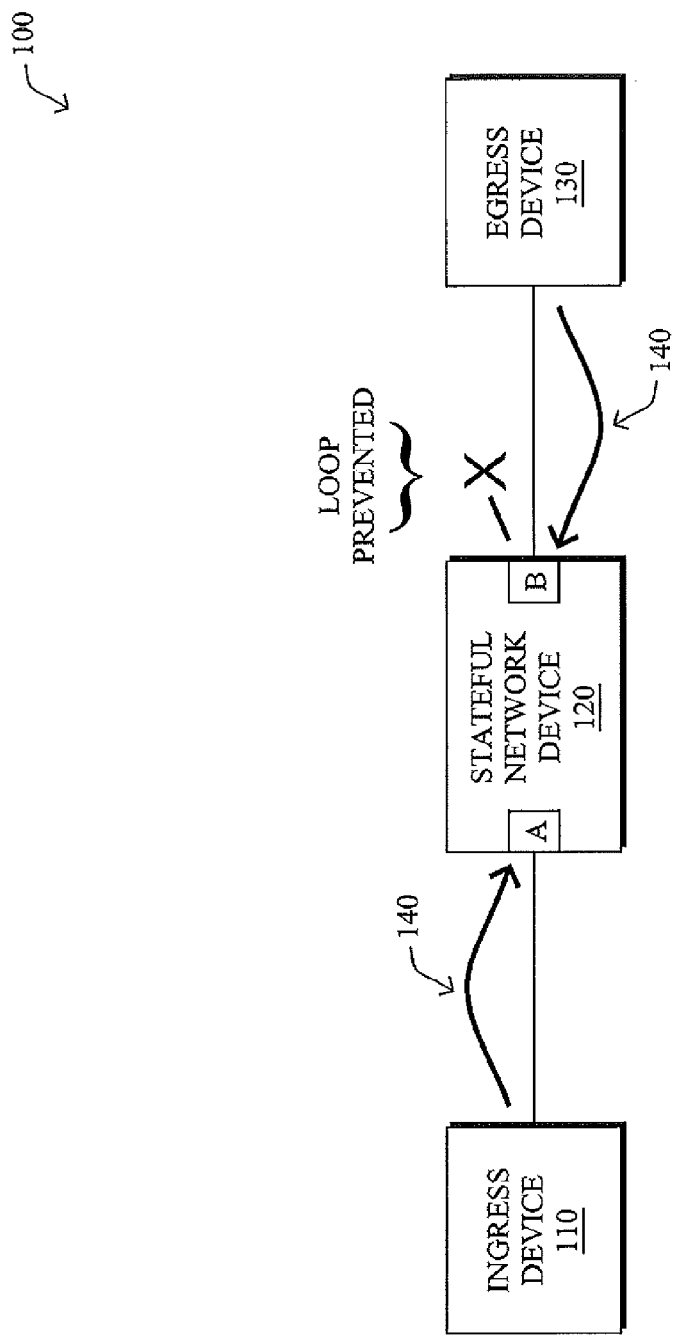
FIGS. 7A-7B illustrate examples of loop mitigation.

This additional connection lookup establishes whether the packet is matching a preexisting connection entry that points out to the same interface as the ingress one. In particular, the device can thus detect that a loop exists at a particular interface in response to the swapped source identification and destination identification matching an existing entry in the stateful connection table. Based on the example above, therefore, upon checking the packet against the previously created stateful entry, a match results as shown in FIG. 6, thus indicating that the packet previously sent out interface B was looped back to interface B. The stateful network device 120 may then conclude that traffic to 2.2.2.2 is looped at the egress device 140, and the packet is correspondingly dropped, as shown in FIG. 7A. Note that in certain specific embodiments herein, in order to differentiate a situation where the loop is short-lived and to thus avoid a false positive, the detection mechanism could optionally make a decision only after packets pertaining to the same connection entry, socket, or IP address are looped for a configured time duration.

Figure 7B:
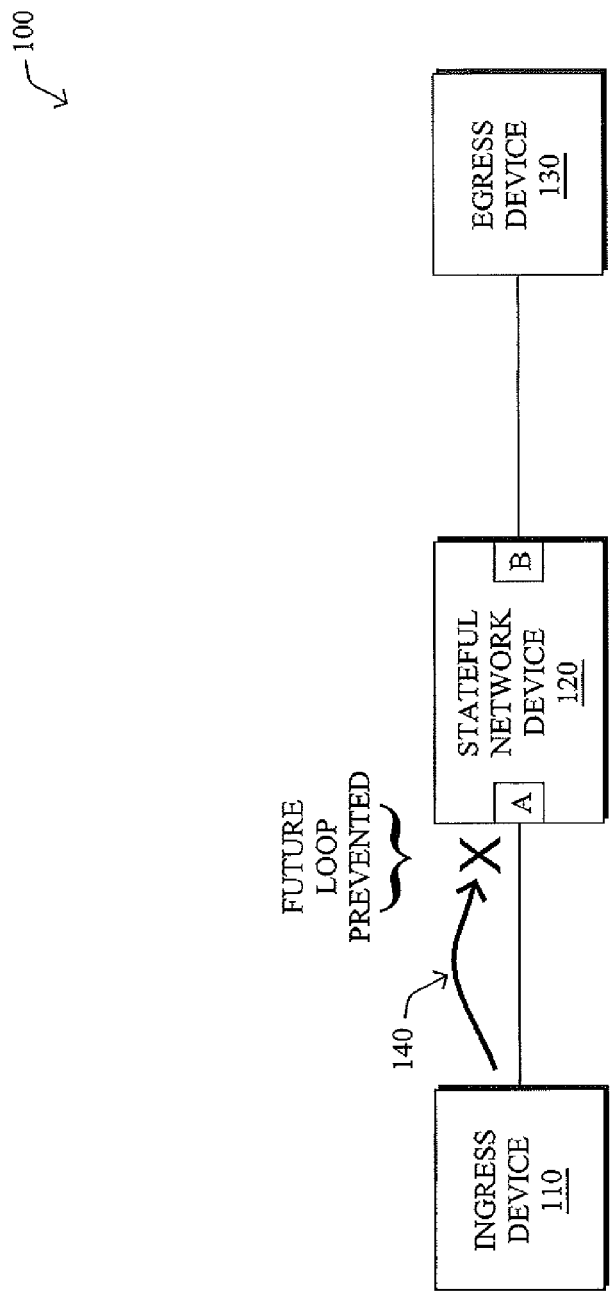

Note further that as shown in FIG. 7B, in addition to dropping the looped packet, the stateful device can take active steps and minimize the processing impact of the looped traffic as well as eliminate the load on the upstream egress device that is potentially causing the loop. For example, to protect itself and the upstream link, the stateful network device can terminate all existing stateful connections to the destination identification (e.g., 2.2.2.2) that are established out of interface B, and can prevent any future connections to that destination for some time, for example, in order to allow the network and/or a network administrator to resolve the loop. That is, the techniques herein allow the stateful network device 120 to install a time-based "deny" rule (or "shun" entry) ingress at interface A (and other applicable data interfaces) for any traffic destined to the destination address or address/port pair if such granularity is required (e.g., 2.2.2.2 or 2.2.2.2:80). This timer allows the stateful device to restore communication to the given destination when the loop is resolved by periodically allowing the suspected connections to be established and monitoring their state in the manner described above. Prior to expiration of this timer, however, any ingress traffic matching this entry would then be dropped during early stateful connection lookups to preserve the CPU resources and stateful connection table space (and also the resources of the egress device 130).

Note that the stateful network device may also be configured to alert a system administrator of the detected loop through a generated/sent notification using a common audit protocol (e.g. audit protocol notification, system log notification "syslog," or simple network management protocol "SNMP").

The techniques herein thus allow a stateful device (e.g., firewall) to detect a loop substantially immediately upon receipt of a looped packet by checking its stateful table 500, dropping the looped traffic, resetting the applicable connections (to avoid unnecessarily transmitted data), and blocking other traffic to the same destination for a pre-defined duration while the loop is being resolved (e.g., narrowing the loop down to the particular pair of source and destination addresses and transport ports, which is useful for detecting "hairpin" loops with Policy Based Routing (PBR) in-use). Additionally, since firewalls and other stateful devices are very much limited in their processing capacity compared to routers and switches, blocking subsequent traffic at interface A will save significant resources and protect the processor(s) of the stateful device itself.

Figure 8:
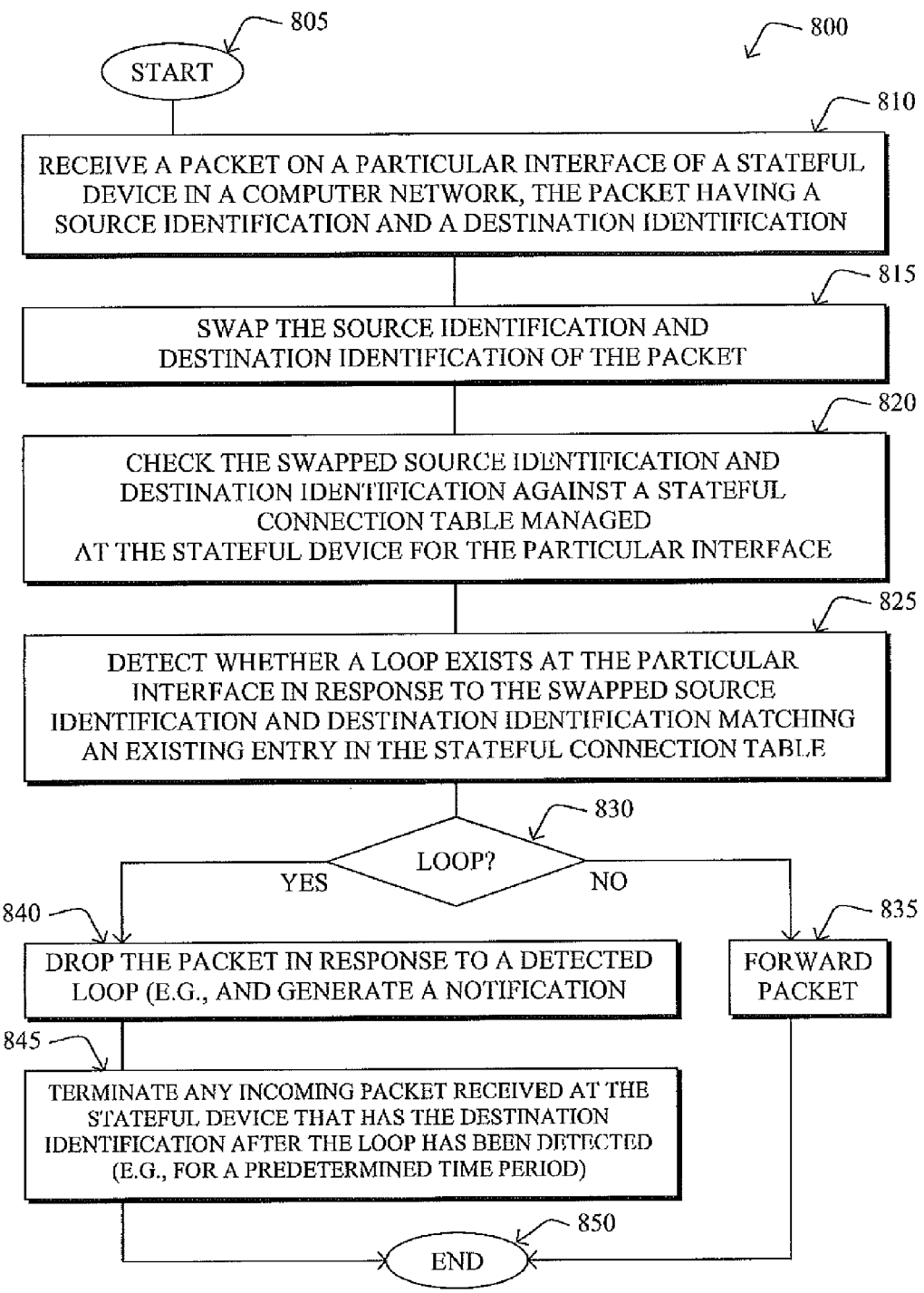
FIG. 8 illustrates an example simplified procedure for detection and mitigation of forwarding loops in stateful network devices.

FIG. 8 illustrates an example simplified procedure 800 for detection and mitigation of forwarding loops in stateful network devices in accordance with one or more embodiments described herein. The procedure 800 may start at step 805, and continues to step 810, where, as described in greater detail above, a stateful network device 120 may receive a packet 140 (with source identification 420 and a destination identification 430) on a particular interface. As detailed above, the stateful device may then swap the source identification and destination identification of the packet in step 820 in order to check the swapped source identification and destination identification against a stateful connection table 500 managed at the stateful device for the particular interface. Through this comparison/look-up, the stateful device 120 can detect whether a loop exists at the particular interface in response to the swapped source identification and destination identification matching an existing entry in the stateful connection table in a manner as described above.

If the determination (step 830) is that there is no loop, then the packet may be forwarded in step 835 accordingly. However, if there is a loop (i.e., if there is a match of the swapped source and destination identifications, then in step 840 the packet is dropped (e.g., and a notification is generated). Also, according to one or more specific embodiments herein, the stateful device 120 may also terminate any incoming packet received at the stateful device in step 845 that has the destination identification after the loop has been detected (e.g., for a predetermined time period). The procedure 800 illustratively ends in step 850, though with the option to receive additional packets in step 810 and/or 845.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for detection and mitigation of forwarding loops in stateful network devices. In particular, unlike in non-stateful protocols (e.g., uRPF) where routing table lookups are used against the source IP of ingress packets, the techniques herein rely on stateful connection information to detect loops with absolute certainty. Since the techniques herein allow a stateful network device to determine whether traffic to the particular transport service (IP:port) or host (IP) is being looped upstream, the techniques herein can thus block matching future connections at the ingress to preserve local and upstream resources. In other words, the device will no longer need to receive the looped traffic back before blocking it, which is unlike uRPF and similar existing mechanisms. In addition, the techniques herein add extra granularity for detection and mitigation through the ability to block connections only to a particular transport service.

While there have been shown and described illustrative embodiments that provide for detection and mitigation of forwarding loops in stateful network devices, it is to be understood that various other adaptations and modifications may be made within the spirit and scope of the embodiments herein. For example, the embodiments have been shown and described herein with relation to particular stateful devices (e.g., firewalls). However, the embodiments in their broader sense are not as limited, and may, in fact, be used with other types of stateful devices. In addition, while certain protocols are shown, such as IPv6 addresses, other suitable protocols may be used, accordingly. Moreover, while the techniques above generally reference physical interfaces, the techniques may also be applicable to virtual interfaces, as may be understood by those skilled in the art.

Also, while the examples above do not explicitly refer to a particular transport protocol such as TCP or UDP, the techniques herein may also track the type of the transport protocol (TCP/UDP) in the connection table 500, along with other parameters. For example, the following two entries would correspond to different connections despite the match in the source and destination identification:

TCP [A] 1.1.1.1:11111 (3.3.3.3:33333)->[B] 2.2.2.2:80 (2.2.2.2:80); and

UDP [A] 1.1.1.1:11111 (3.3.3.3:33333)->[B] 2.2.2.2:80 (2.2.2.2:80).

Accordingly, the techniques herein are not limited to the simplified examples given above, and other stateful parameters may be used to identify the source and destination for packets at the interfaces of the stateful network device.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving a packet on a particular interface of a stateful device in a computer network, the packet having a source identification and a destination identification;
   swapping the source identification and destination identification of the packet;
   checking the swapped source identification and destination identification against a stateful connection table managed at the stateful device for the particular interface;
   detecting that a loop exists at the particular interface in response to the swapped source identification and destination identification matching an existing entry in the stateful connection table by:
      detecting that the loop exists at the particular interface in response to the packet sharing the same swapped source identification and destination identification as a previous packet after a predetermined time duration has been exceeded since the swapped source identification and destination identification of the previous packet matched the existing entry in the stateful connection table; and dropping the packet in response to a detected loop.

2. The method as in claim 1, further comprising:

terminating any incoming packet received at the stateful device that has the destination identification after the loop has been detected.

3. The method as in claim 2, wherein terminating comprises:

terminating any incoming packet received at the stateful device that has the destination identification for a predetermined time period.

4. The method as in claim 1, wherein the destination identification comprises one of either a destination address or a destination address and port address pair.

5. The method as in claim 1, wherein the stateful device is a device selected from a firewall, a router, a content engine, or a load balancer.

6. The method as in claim 1, wherein the source information and destination information comprise one or more identifiers selected from an Internet Protocol (IP) address, a connection entry, a socket, a port, and a transport service.

7. The method as in claim 1, further comprising:

generating a notification upon detecting the loop.

8. The method as in claim 7, wherein the notification is selected from an audit protocol notification, a system log (syslog) notification, and a simple network management protocol (SNMP) notification.

9. An apparatus, comprising:

one or more network interfaces to communicate within a computer network;

a processor coupled to the network interfaces and adapted to execute one or more processes; and a memory configured to store a stateful connection table and a process executable by the processor, the process when executed operable to:

receive a packet on a particular interface of the one or more network interfaces, the packet having a source identification and a destination identification;

swap the source identification and destination identification of the packet;

check the swapped source identification and destination identification against the stateful connection table for the particular interface;

detect that a loop exists at the particular interface in response to the swapped source identification and destination identification matching an existing entry in the stateful connection table by:

detecting that the loop exists at the particular interface in response to the packet sharing the same swapped source identification and destination identification as a previous packet after a predetermined time duration has been exceeded since the swapped source identification and destination identification of the previous packet matched the existing entry in the stateful connection table; and drop the packet in response to a detected loop.

10. The apparatus as in claim 9, wherein the process when executed is further operable to:

terminate any incoming packet received at the apparatus that has the destination identification after the loop has been detected.

11. The apparatus as in claim 10, wherein the process when executed to terminate is further operable to:

terminate any incoming packet received at the apparatus that has the destination identification for a predetermined time period.

12. The apparatus as in claim 9, wherein the destination identification comprises one of either a destination address or a destination address and port address pair.

13. The apparatus as in claim 9, wherein the apparatus is a device selected from a firewall, a router, a content engine, and a load balancer.

14. The apparatus as in claim 9, wherein the packet source information and destination information is selected from an Internet Protocol (IP) address, a connection entry, a socket, a port, and a transport service.

15. The apparatus as in claim 9, wherein the process when executed is further operable to:

generate a notification upon detecting the loop.

16. The apparatus as in claim 9, wherein the notification is selected from an audit protocol notification, a system log (syslog) notification, and a simple network management protocol (SNMP) notification.

17. A tangible, non-transitory, computer-readable media having software encoded thereon, the software, when executed by a processor on a stateful device in a computer network, operable to:

receive a packet on a particular interface of the stateful device, the packet having a source identification and a destination identification;

swap the source identification and destination identification of the packet;

check the swapped source identification and destination identification against a stateful connection table managed at the stateful device for the particular interface;

detect that a loop exists at the particular interface in response to the swapped source identification and destination identification matching an existing entry in the stateful connection table by:

detecting that the loop exists at the particular interface in response to the packet sharing the same swapped source identification and destination identification as a previous packet after a predetermined time duration has been exceeded since the swapped source identification and destination identification of the previous packet matched the existing entry in the stateful connection table; and drop the packet in response to a detected loop.

18. The computer-readable media as in claim 17, wherein the software, when executed, is further operable to:

terminate any incoming packet received at the stateful device that has the destination identification after the loop has been detected.

* * * * *